Jan. 1, 1963 A. BRETTE 3,071,003
VERTICAL TURBINE FLUID METER
Filed March 23, 1960 3 Sheets-Sheet 3

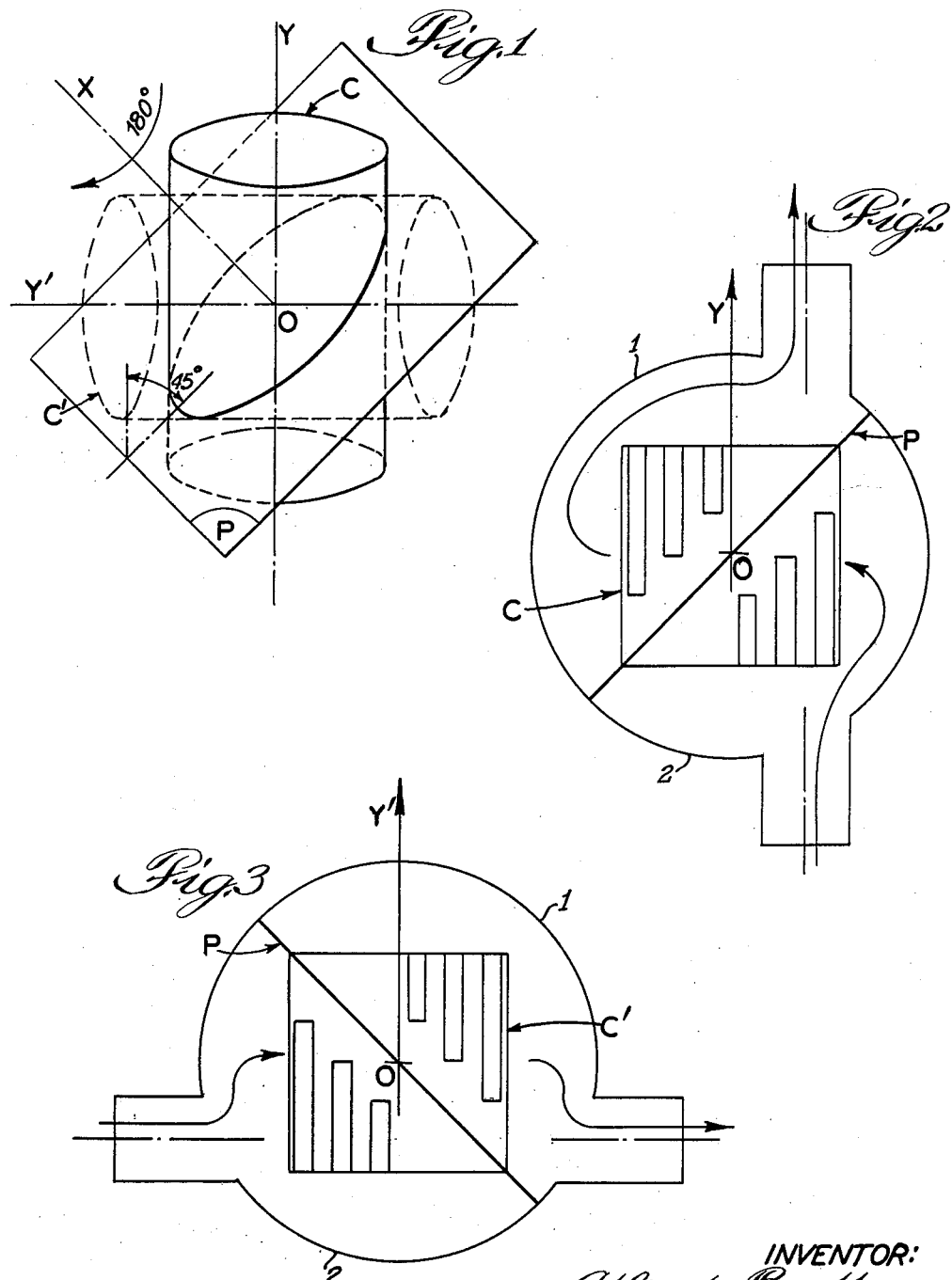

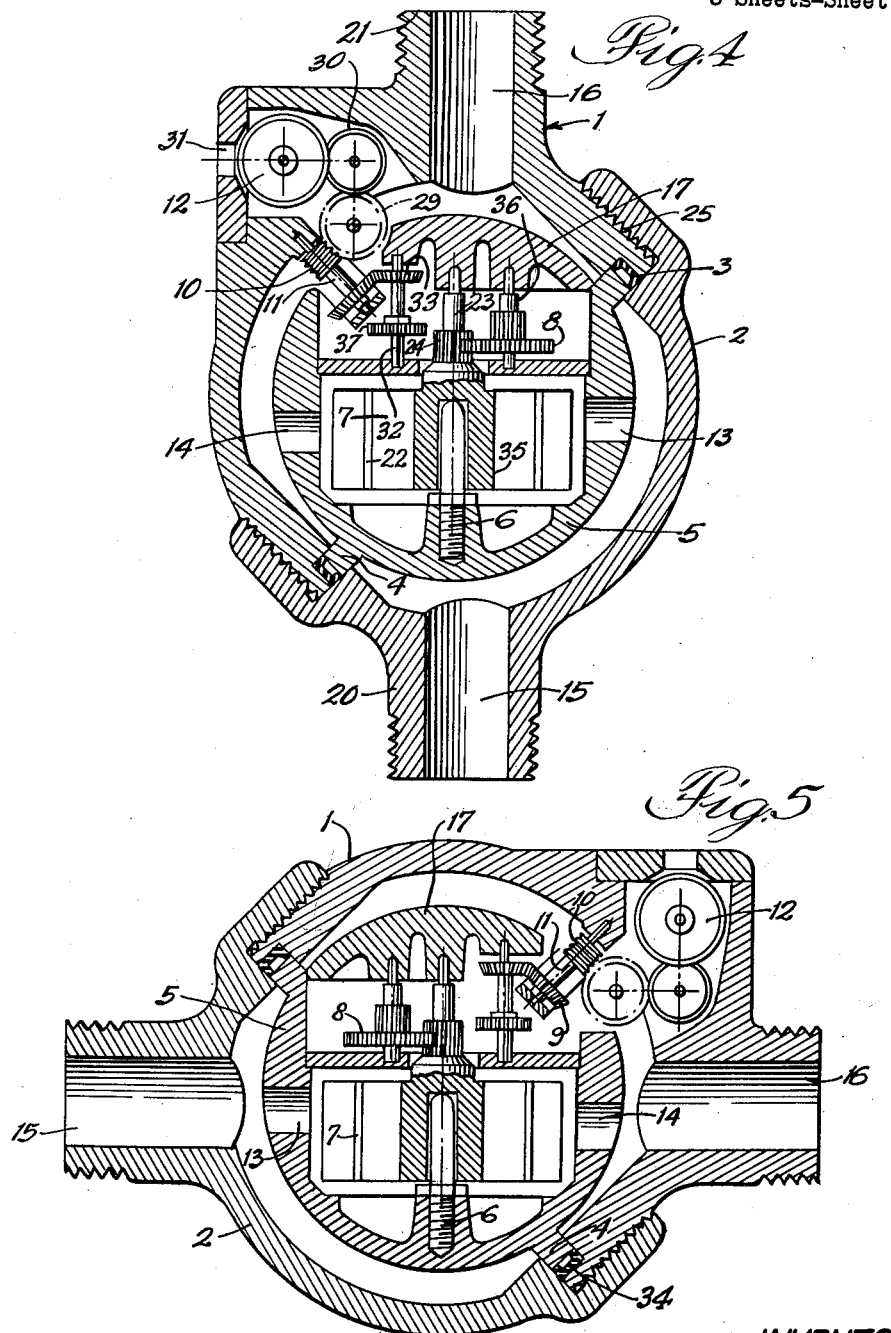

INVENTOR:
Alfred Brette,
BY Louis Bernar
ATTORNEY.

United States Patent Office 3,071,003
Patented Jan. 1, 1963

3,071,003
VERTICAL TURBINE FLUID METER
Alfred Brette, Montrouge, France, assignor to Compagnie pour la Fabrication des Compteurs et Material d'Usines a Gaz, Montrouge-Seine, France, a corporation of France
Filed Mar. 23, 1960, Ser. No. 17,076
10 Claims. (Cl. 73—229)

This invention relates generally to fluid flow measuring devices, and more particularly to a new and improved fluid meter assembly which is adaptable for use with variously oriented fluid conduits by means of a relatively simple and easily made adjustment.

Those skilled in the art will readily appreciate that it often is desirable to connect a fluid measuring meter to fluid conduits or pipes which may be vertically disposed, or horizontally disposed, or disposed at some angle therein between. In the past, it has been necessary to provide fluid meters which are specifically adapted for use with a particularly oriented conduit, and it has not been possible to utilize the same fluid meter with variously oriented conduits without considerable modification or alteration of the fluid meter assembly.

It further will be understood by those skilled in the art that it frequently is desirable in such fluid meters to utilize a vertical turbine, that is, a turbine which is adapted to rotate about a vertical axis in response to the passage of the fluid thereby. Heretofore, the provision of a fluid meter assembly with a vertical turbine for use with vertically oriented conduits has not been readily adaptable for use with horizontally oriented conduits or obliquely oriented conduits and for this reason, different fluid meters have been required for use with differently oriented conduits.

Accordingly, it is a general object of this invention to provide a new and improved fluid meter assembly which overcomes the difficulties and deficiencies of the prior art devices.

More specifically, it is an object of this invention to provide a new and improved fluid meter assembly which is readily adaptable for use with conduits of various orientations and wherein the fluid turbine is maintained in a vertical position.

In accordance with a feature of one illustrative embodiment of this invention, the fluid meter assembly comprises a housing formed of two generally hemispherical housing members having a pair of tubes or pipes for permitting passage of the fluid to the turbine within the housing and for permitting passage of the fluid from the turbine to the exterior of the housing, respectively. The turbine is pivotally mounted for rotation about a vertical axis within a turbine case that is fitted within the central recess defined by the two housing members. Advantageously, the meter case is formed with an annular flange extending around the outer circumference of the meter case and which is adapted to mate with an annular groove defined by the housing members.

In accordance with a highly unique feature of this invention, the annular flange defines a plane which is at a 45° angle with respect to the vertical axis of rotation of the turbine. The meter case is adapted to be rotated about an axis perpendicular to its plane, which axis also is displaced 45° from the vertical axis of rotation of the turbine.

As explained in greater detail hereinbelow, the fluid meter assembly may be converted to a form adaptable for use with vetrically oriented conduits, or to a form adaptable for use with horizontally oriented conduits, or to a form adaptable for use with obliquely oriented conduits, all by means of the relatively easy and simple rotation of the turbine case with respect to the meter housing.

Thus, the meter case of a vertically oriented meter assembly may be rotated 180° about the axis perpendicular to the plane of the annular flange, and if the entire housing subsequently is rotated 90°, the resulting structure is adapted for use with horizontally oriented conduits with the turbine being maintained in a vertical position for rotation about its vertical axis.

Advantageously, an indication of fluid flow, as determined by the rotation of the turbine, is provided by means of a suitable register, counter or some other indicating device which is geared to the turbine for rotation therewith. This advantageous operation is provided, in accordance with a unique feature of the invention, by means of an intermediate gearing arrangement positioned between the turbine and the register and having its axis of rotation co-axial with the axis of rotation of the turbine case.

Thus, it is an object of this invention to provide a new and improved fluid meter assembly wherein the turbine case is pivotally mounted for rotation within the meter housing on an axis located at a 45° angle with respect to the axis of the inlet and outlet tubes of the meter housing.

It is another feature of this invention to provide such a new and improved meter assembly, as described above, wherein a vertical turbine fluid meter may be converted for use with conduits of one orientation to conduits of a different orientation merely by a rotation of certain parts thereof, thereby requiring no modification or reconstruction of the meter.

It is still another object of this invention to provide a new and improved fluid meter assembly, as above, which is characterized by its relative simplicity, its flexibility, and its high degree of adaptability to conduits of various orientations and configurations.

The above and other features which are characteristic of the invention are set forth with particularity in the appended claims. The invention itself, however, both as to its organization and mode of operation, together with further objects and advantages thereof, will best be understood by reference to the following description taken in conjunction with the accompanying drawing in which:

FIGURE 1 is a geometrical illustration of the principles of operation of the invention;

FIGURES 2 and 3 are diagrammatic views illustrating the invention as adapted for use with vertical and horizontal conduits, respectively;

FIGURE 4 is a side elevational view, in cross-section, of a preferred embodiment of the invention as particularly adapted for use with vertically oriented conduits;

FIGURE 5 is a side elevational view, in cross-section, of a preferred embodiment of the invention as particularly adapted for use with horizontally oriented conduits;

Figure 6:
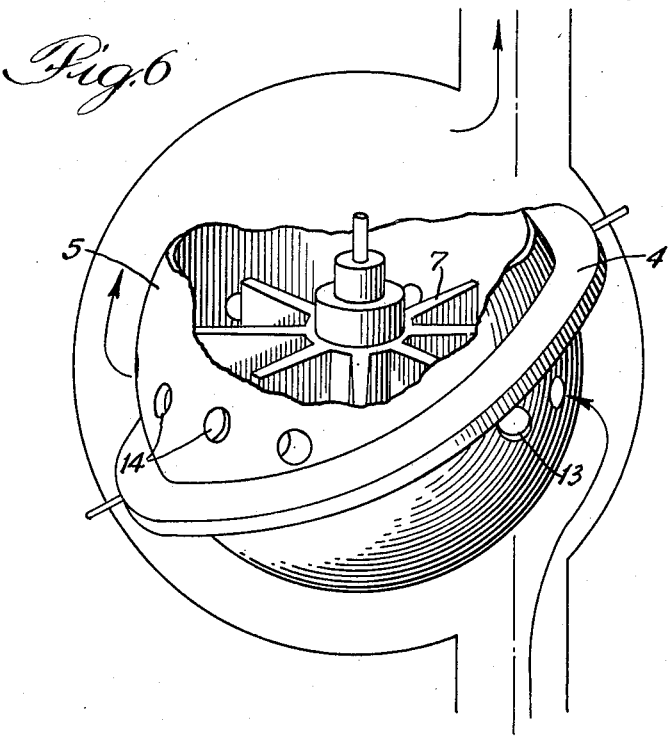
FIGURE 6 is a perspective view of the turbine case and annular flange construction, partly broken away to illustrate the vertical turbine therewithin.

Referring now to the drawing, and more particularly to FIGURE 1 thereof, there is shown in solid lines a cylinder C having a vertical axis OY. The cylinder C is intersected by a plane P along a surface which is at a 45° angle with respect to the vertical axis OY of the cylinder C. In addition, there is shown the axis OX which is perpendicular to the surface of the plane P and which is displaced at a 45° angle with respect to the vertical axis OY of the cylinder C.

It can be seen that if the cylinder C and the plane P are rotated at 180° about the axis OX, the plane P will remain in its original plane, but the cylinder C will be displaced 90° with respect to its original position. This new position for the cylinder C is shown as C' in dotted line form in FIGURE 1 and it can there be seen that the axis of the cylinder C′ after such 180° rotation is along the horizontal axis OY′ as shown in FIGURE 1. Thus, it can be understood that the rotation of the cylinder C and plane P for 180° about the OX axis results in the plane P remaining in its original planar position, but causes the cylinder C to be moved from a vertical to a horizontal position.

The principle of operation described hereinabove is utilized in a new and advantageous manner in the fluid meter assembly comprising the present invention. This is illustrated in FIGURE 2 of the drawing wherein the cylinder C represents a vertically oriented turbine of the type suitably used in a fluid meter. The cylinder C is enclosed within a meter housing formed of the housing members 1 and 2, respectively, which are joined together at the junction line P. The plane of junction P is representative of the intersect plane P shown in FIGURE 1 of the drawing.

It will be noted that each of the housing members 1 and 2 is provided with a suitable tube or pipe for permitting the passage of fluid therethrough. Thus, for example, the fluid may enter the fluid meter housing through the lower tube, as indicated by the arrow, for operative contact with the rotatable turbine C. Similarly, the fluid leaving the turbine C is permitted to leave the fluid meter housing at the upper tube or pipe as indicated by the arrow thereat.

It further will be noted that the axis OY shown in FIGURE 2, which is the axis of rotation of the turbine cylinder C, is parallel to the axis of the vertical inlet and outlet fluid tubes or pipes. Also, it will be noted that the line of junction of the housing members 1 and 2 at the plane P is of a 45° angle with respect to the axis OY.

If the turbine cylinder C is rotated within the housing members 1 and 2 for 180° about an axis perpendicular to the plane P then, as explained hereinabove, the cylinder C will end up in a horizontal position displaced 90° from the position shown in FIGURE 2. Then, if the housing is rotated 90°, the cylinder will return to a vertical position having its axis OY′ vertically disposed, but the housing will be disposed 90° from its original position with the inlet and outlet tubes aligned along a horizontal axis. This is clearly shown in FIGURE 3 of the drawing which shows the housing conversion from vertical to horizontal orientation—with the turbine being vertically oriented in each case.

It can be seen that the housing is positioned along the horizontal axis to enable the housing to be connected to horizontally oriented conduits for the passage of fluid therethrough, and at the same time, the turbine cylinder C′ is aligned vertically with its vertical axis OY′ being the same as the original axis OY. Thus, by merely rotating the turbine cylinder for 180° on an axis perpendicular to the plane P the fluid meter has been converted from one adaptable for use with vertically oriented conduits to one adaptable for use with horizontally oriented conduits with the turbine cylinder remaining in the vertical position.

One preferred physical embodiment of fluid meter incorporating the principles of the invention as explained above is shown in FIGURES 4, 5, 6, and 7 of the drawing. The housing members 1 and 2 advantageously may be hemispherical in shape and are threaded as shown at 25 to enable the housings to be joined securely together when the unit is assembled to enclose the turbine case 5 therewithin. The meter housing member 1 comprises a tube or pipe 21 having a fluid carrying opening 16 therein and which advantageously is threaded to enable the tube 21 to be coupled to a suitable conduit carrying the fluid to be measured. In a similar fashion, the housing member 2 comprises a tube 20 having a fluid carrying opening 15 therein and which is threaded for coupling to a suitable fluid carrying conduit.

In accordance with a feature of this invention, the turbine case 5 generally is spherical in shape and is provided with a central cavity therewithin in which a turbine 7 is journalled for rotation on a vertical axis. The turbine 7, which may take any form suitable as known in the art, advantageously comprises a cylindrical hub 35 having a plurality of vanes or blades 22 extending therefrom so that the contact of the fluid with the vanes causes the turbine to be rotated in accordance with the fluid flow.

The turbine 7 is provided with a lower axle or bearing member 6 rotatably journalled in the bottom portion of the turbine case 5 and with an upper axle or bearing member 23 rotatably journalled in the upper portion of the turbine case 5. Advantageously, the mounting of the turbine in the case is such to minimize frictional and other effects which would adversely effect the fluid meter reading. An indication of the fluid measurement is provided by means of the register or counter means 12 which is positioned in the housing member 1.

Advantageously, the register means 12 is geared to the turbine through a suitable speed changing gear chain to enable the rotational movement of the turbine to be transmitted to the register means for measurement of fluid flow. To this end the turbine hub 35 is provided with a driving gear 24 which meshes with the gear 8 positioned on the rotatable shaft 36. The gear 8 is coupled in a suitable manner to the gear 37 on the gear shaft 32 so that the conical gear 33 also on gear shaft 32, is rotated in accordance with the turbine movement.

In accordance with a further feature of this invention, the conical gear 33 is meshed with a further conical gear 9 which is positioned for rotation around an axis defined by the shaft 11 which carries the conical gear 9. It is important to note that the shaft 11 lies on an axis which is displaced 45° from the axis of rotation of the turbine 7—the axis of shaft 11 corresponding to the axis OX in FIGURE 1 and the axis of rotation of the turbine 7 corresponding to the axis OY in FIGURE 1.

A worm gear 10 is positioned on shaft 11 for rotation therewith. Worm gear 10 is coupled to gear 29, which, in turn, is coupled to gear 30 for operating the register means 12 in accordance with fluid flow at the turbine. Advantageously, the housing 1 is provided with an eye viewing opening 31 to enable observation of the reading on the register means 12.

In accordance with a salient feature of this invention, the turbine case 5 is provided with an annular flange 4 which extends around the circumference of the case. This flange 4 is particularly illustrated in FIGURE 6 of the drawing, and is shown in cross-section in FIGURES 4, 5 and 7. Advantageously, the junction of the housing members 1 and 2 define an annular groove 3 extending circumferentially around the inner surface of the housing to receive the annular flange 4 therein. Desirably, the annular groove 3 is provided with a suitable seal 34 therein to prevent fluid from passing from one side of the turbine case to the other side of the turbine case at the junction of the annular flange 4 and groove 3, and to render the junction of the housing members 1 and 2 fluid tight.

In the operation of the invention, fluid enters the opening 15 in tube 20 and is applied to the vanes 22 of the turbine 7 by means of the injection orifices 13 provided at one side of the turbine case. While the injection orifices may have any suitable shape and direction, advantageously, they may be circular as shown in FIGURE 6 of the drawing and oriented in shape as in the manner shown in FIGURE 7 of the drawing. However, the particular orientation of the orifices may be varied as desired over a wide range.

Figure 7:
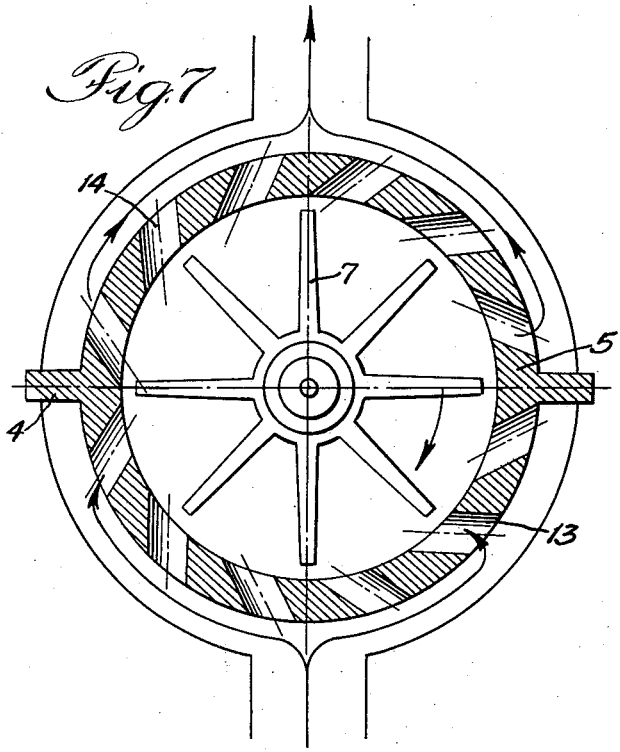
FIGURE 7 is a top plan view, in cross-section, of the turbine, turbine case, and meter housing construction.

The fluid leaves the turbine at the ejection orifices 14, particularly shown in FIGURES 6 and 7, which are provided at the other side of the turbine case, and leaves the housing through the outlet opening 16 in tube 21.

It can be seen that the annular flange 4 serves to separate the injection orifices from the ejection orifices so that the fluid is caused to pass by the turbine 7 to rotate the latter to provide an indication of fluid flow measurement at the register means 12.

It further will be noted that the annular flange 4 defines a plane which is at a 45° angle with respect to the vertical axis of turbine rotation and which is perpendicular to the axis of rotation of the shaft 11. Thus, as explained hereinabove, if the turbine case 5 is rotated 180° on the diagonal axis perpendicular to the plane of the annular flange 4, the axis of rotation of the turbine 7 will end up in a horizontal position displaced 90° from its original vertical position. If, at this time, the housing members 1 and 2 then are rotated 90°, the turbine 7 will be returned to its vertically oriented position. Thus, the direction of the fluid movement through the turbine will be horizontal rather than vertical.

The vertical orientation for fluid movement is particularly illustrated in FIGURE 4 and the horizontal orientation is particularly illustrated in FIGURE 5 of the drawing. In FIGURE 5, it can be seen that the fluid openings 15 and 16 in tubes 20 and 21, respectively, are horizontally oriented to enable connection of the fluid meter to horizontally oriented conduits. Thus, in order to convert the fluid meter from vertical to horizontal orientation, all that is necessary is the 180° rotation of the turbine case 5 within the housing around an axis perpendicular to the plane defined by the annular flange 4 and groove 3, and a subsequent 90° rotation of the entire housing to place the inlet and outlet conduits in horizontal position. This conversion has been effected with no structural modifications or change in the fluid meter other than the two rotations described above.

Manifestly, as will be appreciated by those skilled in the art, the fluid meter assembly may be utilized with conduits having orientations other than vertical or horizontal. Thus, in order to couple the fluid meter assembly to conduits making any angle alpha with a vertical axis, it is sufficient merely to turn the annular flange of the turbine case a suitable amount in accordance with the principles described above. It is apparent that the axis of the turbine will remain vertical when the tubes of the meter housing are coupled to the fluid conduits.

While the hemispherical form of the housing members 1 and 2 as well as the spherical form of the meter case are particularly adapted to efficient use with the invention, it will be appreciated by those skilled in the art that the invention is not limited to these particular illustrative shapes, and that many variations may be provided which are equally adapted to enjoy the advantages of the invention.

In addition, the inlet and outlet tubes of the housing, which are shown as aligned on the same axis in the illustrative embodiments of the drawing, may be provided at right angles to each other to permit coupling of the fluid meter assembly on two tubes which are at right angles with respect to each other.

Further, the housing members can take on any form, as for example, spherical, ovoid, cylindrical, or the like, the only condition being that the annular flange and the groove within which the flange is positioned should have a circular cross-section.

Those skilled in the art will further appreciate that the turbine case may take on any form and may be comprised of one or more component parts. Further, the register means 12 can be of any desired type, either wet or dry, but in the latter case, a suitable moisture seal should be provided to prevent the fluid from possibly damaging the register.

While there has been shown and described a specific illustrative embodiment of the present invention, it will of course be understood by those skilled in the art that various modifications and alternative constructions may be made without departing from the true spirit and scope of the invention. Therefore, the appended claims are intended to cover all such modifications and alternative constructions as fall within their true spirit and scope.

What is claimed as the invention is:

1. A meter assembly for measuring fluid flow comprising the combination of a housing having a fluid inlet and a fluid outlet, said housing having a central cavity therewithin for receiving a turbine case, said turbine case being formed with a fluid injection orifice in communication with the fluid inlet and a fluid ejection orifice in communication with the fluid outlet, turbine means mounted within said turbine case for rotation in response to fluid flow through a fluid path defined by said fluid inlet, said fluid injection orifice, said turbine means, said fluid ejection orifice and said fluid outlet, journal means coupling said turbine case to said housing for rotating said turbine case in said cavity around an axis displaced 45° from the axis of turbine rotation, means for securing said turbine case in a selected rotated position in said cavity, thereby enabling said turbine means to be vertically oriented in its operative position regardless of the orientation of the housing, fluid barrier means between said turbine case and said housing separating said fluid inlet and fluid injection orifice from said fluid outlet and fluid ejection orifice, register means for indicating fluid flow, and means operatively coupling said register means to said turbine means.

2. A meter assembly for measuring fluid flow comprising the combination of a housing having a fluid inlet and a fluid outlet, said housing having a central cavity therewithin for receiving a turbine case, turbine means mounted within said turbine case for rotation in response to fluid flow through a fluid path defined by said fluid inlet, said turbine means, and said fluid outlet, journal means coupling said turbine case to said housing for rotating said turbine case in said cavity around an axis displaced 45° from the axis of turbine rotation, means for securing said turbine case in a selected rotated position in said cavity, thereby enabling said turbine means to be vertically oriented in its operative position regardless of the orientation of the housing, fluid barrier means between said turbine case and said housing separating said fluid inlet from said fluid outlet, register means for indicating fluid flow, and means operatively coupling said register means to said turbine means.

3. A meter assembly for measuring fluid flow comprising the combination of a housing having a fluid inlet and a fluid outlet, said housing having a central cavity therewithin for receiving a turbine case, said turbine case being formed with a fluid injection orifice in communication with the fluid inlet and a fluid ejection orifice in communication with the fluid outlet, turbine means mounted within said turbine case for rotation in response to fluid flow through a fluid path defined by said fluid inlet, said fluid injection orifice, said turbine means, said fluid ejection orifice and said fluid outlet, journal means coupling said turbine case to said housing for rotating said turbine case in said cavity around an axis displaced 45° from the axis of turbine rotation, means for securing said turbine case in a selected rotated position in said cavity, thereby enabling said turbine means to be vertically oriented in its operative position regardless of the orientation of the housing, said journal means also providing fluid barrier means between said turbine case and said housing separating said fluid inlet and fluid injection orifice from said fluid outlet and fluid ejection orifice, register means for indicating fluid flow positioned within said housing, and coupling means coupling said register means to said turbine.

4. A meter assembly in accordance with claim 3 wherein said register coupling means comprises a rotatable shaft aligned co-axially with the axis of rotation of said turbine case.

5. A meter assembly for measuring fluid flow comprising the combination of a housing including a first housing member having a fluid inlet conduit and a second housing member having a fluid outlet conduit, said housing having a central cavity therewithin for receiving a turbine case, said turbine case being formed with a fluid injection orifice in communication with the fluid inlet conduit and a fluid ejection orifice in communication with the fluid outlet conduit, turbine means mounted within said turbine case for rotation in response to fluid flow through a fluid path defined by said fluid inlet conduit, said fluid injection orifice, said turbine means, said fluid ejection orifice and said fluid outlet conduit, journal means coupling said turbine case to said housing for rotating said turbine case in said cavity around an axis displaced 45° from the axis of turbine rotation, means for securing said turbine case in a selected rotated position in said cavity, thereby enabling said turbine means to be vertically oriented in its operative position regardless of the orientation of the housing, fluid barrier means between said turbine case and said housing separating said fluid inlet conduit and fluid injection orifice from said fluid outlet conduit and fluid ejection orifice, register means for indicating fluid flow, and means operatively coupling said register means to said turbine means.

6. A meter assembly in accordance with claim 5 wherein said journal means and said fluid barrier means comprises an annular flange extending around the circumferential surface of said turbine case and defining a plane perpendicular to the axis of rotation of said turbine case, and said first and second housing members define an annular groove therebetween for receiving said annular flange.

7. An improved meter assembly for measuring fluid flow comprising a pair of housing members adapted when assembled to form a meter housing defining a cavity therewithin, each of said housing members having conduit means for the passage of fluid therethrough, one of said conduit means serving as a fluid inlet for the cavity and the other conduit means serving as a fluid outlet for the cavity, a turbine case positioned within said cavity, turbine means mounted within said case for rotation about a vertical axis during the operation of said meter assembly, said turbine case having a plurality of injection orifices in fluid communication with the fluid inlet conduit of one housing member and a plurality of ejection orifices in fluid communication with the fluid outlet conduit of the other housing member to define a fluid path through the housing past the turbine to enable turbine rotation in accordance with fluid flow, fluid flow indicating means positioned in said housing for providing an indication in accordance with turbine rotation, coupling means for transmitting turbine rotation to said fluid flow indicating means including a coupling shaft positioned for rotation on an axis displaced 45° from the vertical axis of turbine rotation, an arcuate flange extending around the outer circumferential surface of said turbine case, said arcuate flange lying in a plane perpendicular to the axis of the coupling shaft and displaced 45° from the axis of turbine rotation to provide a fluid barrier between the fluid injection orifices and the fluid ejection orifices of the turbine case, and an arcuate groove in the inner surface of the housing co-planar with said arcuate flange for receiving the latter to enable the turbine case to be rotated within the housing cavity for enabling the turbine axis to be vertically oriented for all operative positions of said housing.

8. An improved meter assembly for measuring fluid flow comprising a pair of housing members adapted when assembled to form a meter housing defining a cavity therewithin, each of said housing members having conduit means for the passage of fluid therethrough, one of said conduit means serving as a fluid inlet for the cavity and the other conduit means serving as a fluid outlet for the cavity, a turbine case positioned within said cavity, turbine means mounted within said case for rotation about a vertical axis during the operation of said meter assembly, said turbine case having a plurality of injection orifices in fluid communication with the fluid inlet conduit of one housing member and a plurality of ejection orifices in fluid communication with the fluid outlet conduit of the other housing member to define a fluid path through the housing past the turbine to enable turbine rotation in accordance with fluid flow, register means for indicating fluid flow, means operatively coupling said register means to said turbine means, an arcuate flange extending around the outer circumferential surface of said turbine case, said arcuate flange lying in a plane displaced 45° from the axis of turbine rotation to provide a fluid barrier between the fluid injection orifices and the fluid ejection orifices of the turbine case, and an arcuate groove in the inner surface of the housing co-planar with said arcuate flange for receiving the latter to enable the turbine case to be rotated within the housing cavity for enabling the turbine axis to be vertically oriented for all operative positions of said housing.

9. A meter assembly for measuring fluid flow comprising the combination of a housing including a first housing member having a fluid inlet conduit and a second housing member having a fluid outlet conduit, said housing having a central cavity therewithin for receiving a turbine case, said turbine case being formed with a fluid injection orifice in communication with the fluid inlet conduit and a fluid ejection orifice in communication with the fluid outlet conduit, turbine means mounted within said turbine case for rotation in response to fluid flow through a fluid path defined by said fluid inlet conduit, said fluid injection orifice, said turbine means, said fluid ejection orifice and said fluid outlet conduit, said turbine case being rotatable in said cavity around an axis displaced 45° from the axis of turbine rotation, an annular flange extending around the circumferential surface of said turbine case and defining a plane perpendicular to the axis of rotation of said turbine case, said first and second housing members defining an annular groove therebetween for receiving said annular flange, thereby enabling said turbine means to be vertically oriented in its operative position regardless of the orientation of the housing, register means positioned within one of said housing members for indicating fluid flow, and means operatively coupling said register means to said turbine means.

10. A meter assembly in accordance with claim 9 wherein said register coupling means comprises a rotatable shaft co-axially aligned with the axis of rotation of said turbine case.

References Cited in the file of this patent

UNITED STATES PATENTS

| | | |
|---|---|---|
| 427,486 | Thomson | May 6, 1890 |
| 817,887 | Tilden | Apr. 17, 1906 |
| 1,186,610 | Richards | June 13, 1916 |
| 2,915,304 | Kohler | Dec. 1, 1959 |